(12) United States Patent
Masada et al.

(10) Patent No.: US 8,801,956 B2
(45) Date of Patent: Aug. 12, 2014

(54) HEXAGONAL CRYSTAL FERRITE MAGNETIC POWDER FOR MAGNETIC RECORDING, METHOD FOR PRODUCING THE SAME, AND MAGNETIC RECORDING MEDIUM USING THE POWDER

(75) Inventors: Kenji Masada, Okayama (JP); Tomoyuki Ishiyama, Okayama (JP); Gousuke Iwasaki, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 190 days.

(21) Appl. No.: 13/500,989

(22) PCT Filed: Jan. 29, 2010

(86) PCT No.: PCT/JP2010/051278
§ 371 (c)(1),
(2), (4) Date: Apr. 9, 2012

(87) PCT Pub. No.: WO2011/048823
PCT Pub. Date: Apr. 28, 2011

(65) Prior Publication Data
US 2012/0199782 A1    Aug. 9, 2012

(30) Foreign Application Priority Data

Oct. 20, 2009 (JP) ................................ 2009-241376

(51) Int. Cl.
*C01G 49/00* (2006.01)
*H01F 1/11* (2006.01)

(52) U.S. Cl.
USPC .................. 252/62.62; 252/62.63; 252/62.59; 252/62.54; 252/62.53; 252/62.57

(58) Field of Classification Search
USPC .............. 428/42.38; 252/62.62, 62.63, 62.59, 252/62.54, 62.53, 62.57
See application file for complete search history.

(56) References Cited

U.S. PATENT DOCUMENTS

| 4,636,433 A | 1/1987 | Kubo et al. |
| 4,820,433 A | 4/1989 | Yamamoto et al. |
| 2009/0218540 A1 | 9/2009 | Takami et al. |

FOREIGN PATENT DOCUMENTS

| JP | 61-131230 A | | 6/1986 |
| JP | 63-077105 | * | 4/1988 |
| JP | 63-77105 A | | 4/1988 |
| JP | 4-362020 A | | 12/1992 |
| JP | 3576332 B2 | | 10/2004 |
| JP | 2005-340690 A | | 12/2005 |
| JP | 2006-5300 | * | 1/2006 |
| JP | 2006-156745 A | | 6/2006 |
| WO | 2007/105398 A1 | | 9/2007 |

OTHER PUBLICATIONS

International Search Report for PCT/JP2010/051278, mailed Apr. 27, 2010.

* cited by examiner

*Primary Examiner* — Carol M Koslow
(74) *Attorney, Agent, or Firm* — Greenblum & Bernstein, P.L.C.

(57) ABSTRACT

A hexagonal crystal ferrite magnetic powder having high magnetic characteristics while having a small particle volume and a high specific surface area is provided, and a high-density magnetic recording medium using the powder. A method for producing a hexagonal crystal ferrite formed using a glass crystallization method includes the steps of: mixing a glass matrix with raw materials including iron, bismuth, a divalent metal (M1), a tetravalent metal (M2), any one kind (A) of barium, strontium, calcium, and lead, and at least one kind of rare earth element (represented by R) having a mole equal to or less than that of the iron; heating the mixed raw material to obtain a glass body; quenching the glass body, pulverizing the glass body, and performing a heat treatment, and washing the glass body after the heat treatment with an acid solution.

16 Claims, 4 Drawing Sheets

HEXAGONAL CRYSTAL FERRITE MAGNETIC POWDER FOR MAGNETIC RECORDING, METHOD FOR PRODUCING THE SAME, AND MAGNETIC RECORDING MEDIUM USING THE POWDER

TECHNICAL FIELD

The present invention relates to a hexagonal crystal ferrite magnetic powder suitable for a magnetic recording medium, a magnetic recording medium using the powder, and a method for producing the powder.

BACKGROUND ART

In recent years, a technique for transferring larger amounts of data at a higher speed has been developed, and therefore a technique for saving the data is now being required. Further, the saving technique itself has been being developed, and therefore a magnetic material working as a bridge between both the techniques continues to be investigated.

As a magnetic material used for a coating-type magnetic recording medium, γ-iron oxide, chromium dioxide, a metal magnetic powder, and the like are widely used essentially. In addition, iron nitride ($Fe_{16}N_2$) and iron platinum (FePt) are being investigated recently.

In order to achieve magnetic recording with high density, there is a serious problem, which must be faced, of microparticulation of the magnetic material. Concerned researchers have intensively studied in an effort to form fine particles of the magnetic material and as a result, can provide a magnetic powder having a size smaller than a usually-conceivable size. However, in a case of a fine particle, in particular, a metallic magnetic powder mainly composed of a metal, there is an important problem of deterioration of magnetic characteristics caused by oxidation of the magnetic powder.

In order to solve the problem, use of a material which deteriorates less by oxidation as a material essentially constituting a magnetic powder may be exemplified as a countermeasure. Recently, a ferrite magnetic powder which includes iron oxide and deteriorates less by oxidation is attracted as one candidate of the next generation magnetic powders.

In such a situation, Patent Literatures 1 to 3 disclose a hexagonal crystal ferrite magnetic powder which includes fine particles and has high magnetic characteristics, and the powder is expected to be suitable for use in high-density magnetic recording.

Cited Literature 1 discloses a hexagonal crystal ferrite particle having a plate diameter and a plate thickness defined by geometric standard deviation, with a plate diameter of 18 to 30 nm, and an ordered particle shape. Patent Literature 2 discloses a particle having a plate diameter of 15 to 28 nm and particle size distribution defined by respective $D_{70}$ and $D_{50}$ values. Patent Literature 3 discloses a hexagonal crystal ferrite particle having defined particle diameter and BET value.

CITATION LIST

Patent Literature

Patent Literature 1: Japanese Patent Application Laid-Open No. 2005-340690
Patent Literature 2: Japanese Patent Application Laid-Open No. 2006-005300
Patent document 3: Japanese Patent No. 3576332

SUMMARY OF INVENTION

Problem to be Solved by the Invention

As the magnetic powder disclosed in each of the prior art literatures, there is disclosed a magnetic powder which is composed of fine particles and has high Hc, as described above. However, in order to achieve further high-density magnetic recording, development of a particle having more excellent magnetic characteristics, that is, an ultrafine particle is required.

During formation of a ferrite ultrafine particle, there is a defect in which insufficient ferrite formation causes deterioration of magnetic characteristics. When the particle volume is 2500 $nm^3$ or less and the specific surface area measured by a BET method is 75 $m^2/g$ or more, for example, the magnetic powder deteriorates in orientation and packing properties to become unstable for use in high-density magnetic recording as described in the paragraph 0022 of Patent Literature 3.

In Patent Literature 2, a particle having a specific surface area measured by the BET method of 86 $m^2/g$ is exemplified as Comparative Examples, and the particle has a very lager switching field distribution (SFD) value and deteriorates in magnetic characteristics and is not suitable for practical use. Accordingly, a magnetic powder having a high BET value and high magnetic characteristics suitable for use in high-density magnetic recording has not been obtained conventionally.

In order to achieve high-density magnetic recording, it is believed that it become very important to obtain a magnetic powder falling within a very narrow range, that is, having a high BET value of 75 $m^2/g$ or more and sufficiently high characteristics.

The present inventors have found that a ferrite powder having a small particle volume, a high specific surface area, and high magnetic characteristics has not been found, which causes a problem of versatility of the ferrite magnetic powder, and have decided to solve this problem.

Means for Solving Problem

A magnetic powder having the following properties can be used as a magnetic powder constituting a magnetic recording medium to solve the above-described problems.

The particle provided by the present invention is a hexagonal crystal ferrite particle having an average particle diameter (if the particle has a plate shape, it corresponds to a plate diameter, and if the particle has a spherical shape, it corresponds to a diameter) of 10 to 30 nm, and is formed using a glass crystallization method as a production method.

The production method specifically includes the following four steps when it is broadly divided. Specifically, the four steps include: a first step of mixing a glass matrix with at least six kinds of raw materials including iron, bismuth, a divalent metal (M1), a tetravalent metal (M2), any one kind (A) of barium, strontium, calcium, and lead, and at least one kind of rare earth element (represented by R) having a mole equal to or less than that of the iron; a second step of heating the mixed raw materials to obtain a molten material; a third step of quenching the molten material to form a glass body, then pulverizing the glass body, and performing a heat treatment; and a fourth step of washing the glass body after the heat treatment with an acid solution.

In particular, the present invention is characterized by the substances to be added in the first step. Specifically, rare earth elements are added in the first step. Such a constitution allows suppression of growth of hexagonal crystal ferrite in glass due to the effect of the added rare earth elements in the third step, and thus adjacent particles are bound to each other. Therefore, fine particles can be obtained. In the fourth step, most of the added rare earth elements which remain in the glass are removed by dissolution. However, a slight amount of the elements remains in the hexagonal crystal ferrite particles, and this contributes to improvement of magnetic characteristics.

Next, the powder constituting the present invention is a hexagonal crystal ferrite powder formed from at least six kinds of elements, including iron, bismuth, a divalent metal (represented by M1), a tetravalent metal (represented by M2), any one kind (represented by A) of barium, strontium, calcium, and lead, and at least one kind of rare earth element (represented by R). This can be represented by a composition formula: $(Ba, Sr, Ca, Pd)_a Fe_b Bi_c M1_d M2_e R_f$ (wherein a+b+c+d+e+f=1 and a, b, c, d, e, and f are not 0.)

The above-described powder is a hexagonal crystal ferrite powder having an amount of rare earths of 0.2 to 1.0% by atomic weight relative to iron. Therefore, when the composition formula is $(Ba, Sr, Ca, Pd)_a Fe_b Bi_c M1_d M2_e R_f$, f/b is 0.002 to 0.01.

The above-described powder is a hexagonal crystal ferrite powder in which the rare earth is Nd (neodymium), Sm (samarium), and Y (yttrium).

Further, the powder is a hexagonal crystal ferrite powder having an average particle diameter (if the particle has a plate shape, it corresponds to a plate diameter, and if the particle has a spherical shape, it corresponds to a diameter) of 10 to 30 nm and a specific surface area of 50 to 120 $m^2/g$ as physical characteristics where the specific surface area is calculated by a one point method for BET method.

The powder is a hexagonal crystal ferrite powder having an average particle volume of 100 to 2500 $nm^3$.

The powder is a magnetic powder, and is a hexagonal crystal ferrite magnetic powder having properties including a coercive force of 119.4 to 238.9 kA/m (1500 to 3000 Oe) and a saturation magnetization of 30 to 60 $Am^2/kg$ (30 to 60 emu/g).

A coating in which the powder having the above-described constitution is dispersed, and a high-density magnetic recording medium having a magnetic layer formed by applying the coating are provided.

Advantageous Effects of Invention

According to the present invention, a magnetic powder is composed of ultrafine particles and has high magnetic characteristics, and therefore a magnetic recording medium having a density higher than the conventional one can be provided.

DESCRIPTION OF EMBODIMENTS

Figure 1:
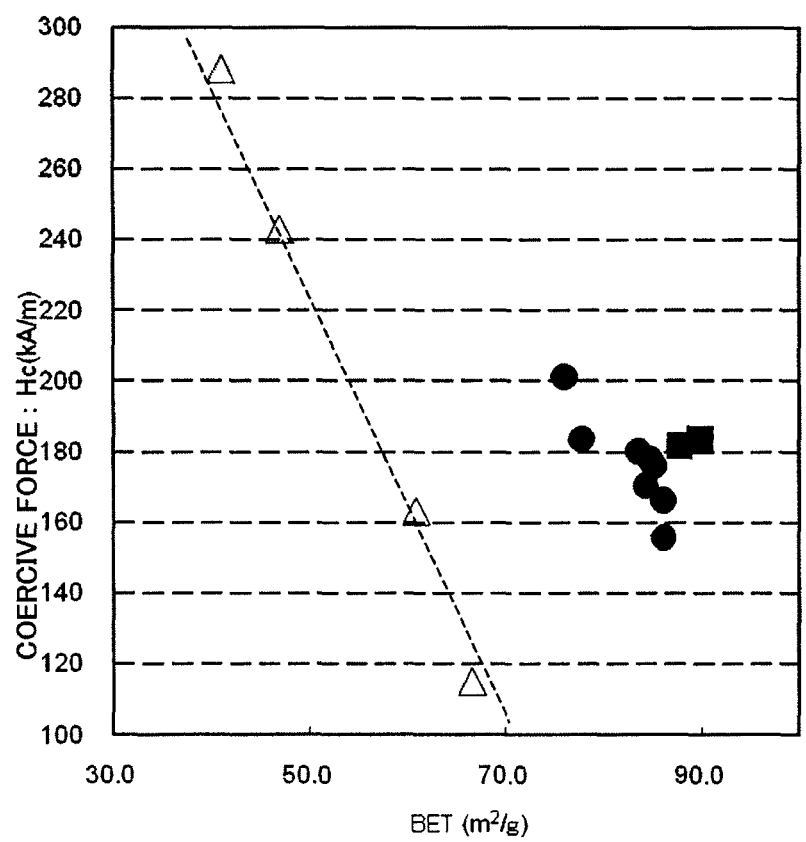
FIG. 1 is a diagram showing the correlation between a specific surface area and a coercive force according to the present invention and Comparative Examples.

The present inventors have investigated to provide a particle having three opposite characteristics of decrease in volume (increase in specific surface area), a high coercive force, and high saturation magnetization, and the present invention has been completed. The present inventors have focused on the composition of particles, and particularly have found that bismuth and rare earth elements, in addition to the constitution of ferrite including an alkaline earth metal element and iron, which are usually known, are added as essential component elements to solve the problems.

<Constitution of Particles>

The particles according to the present invention have a composition of, aside from iron and alkaline earth metal (A) as a main composition, divalent and tetravalent elements to be added (M1 and M2) for adjustment of a coercive force, and bismuth as an element to be added for control of a shape. In addition, the particles include rare earth elements as the element to be added. The addition of the rare earth elements promotes microparticulation of the particle, and decrease in the volume of the particle (increase in the specific surface area) which is one problem is achieved.

Nd, Sm, Y, Er, Ho, and the like are suitable subjects to be selected among the rare earth elements including Y, and in particular, Nd, Sm, and Y are preferably selected. The content of the elements is 0.2 to 1.0% by atomic weight relative to iron. When the composition formula is $(Ba, Sr, Ca, Pd)_a Fe_b Bi_c M1_d M2_e R_f$, f/b is 0.002 to 0.01.

Since the rare earth elements are generally expensive and addition of the elements in an excess amount increases cost, they are not preferable from an industrial viewpoint. Further, since decrease in the addition amount of the elements reduces effects due to the addition, they are not preferable. In a case of such a content, the adjacent particles are isolated after the formation of ferrite particles, and therefore magnetic characteristics can be improved.

In a production method without the above-described components, a magnetic powder which includes small particles locally may be obtained. However, the particles are likely to be sintered together, and a magnetic powder that markedly deteriorates in distribution is likely to be formed. As a result, dispensability during formation of a coating is poor, and a medium surface during formation of the medium is poor. Therefore, it is not preferable.

The component ratio of the total addition amount of alkaline earth metal (A) to be added, other than iron, and the added elements (M1 and M2) relative to the entire amount is less than 0.20, and preferably less than 0.15. Therefore, in $(Ba, Sr, Ca, Pd)_a Fe_b Bi_c M1_d M2_e R_f$, (a+d+e) is less than 0.20, and preferably less than 0.15. When the added components are too many, magnetic characteristics are less likely to be balanced, and therefore it is not preferable. On the other hand, when the addition amount is too small, the effect of addition is not obtained, and therefore it is not preferable.

Addition of bismuth can decrease the temperature of ferrite formation to decrease sintering of the particles, and as a result, can contribute to miniaturization of the particles. Further, the addition amount can be controlled to increase the plate thickness. Accordingly, when the addition amount is too large, particles having a large plate diameter are formed. As a result, the particles may increase in size, and therefore attention is required.

The present inventors have studied and found that the addition amount of bismuth which balances the magnetic characteristics is less than 10% by mole, and preferably less than 5% by mole relative to iron (of course, since bismuth is an essential component, the addition amount of bismuth is more than 0% by mole). Therefore, in $(Ba, Sr, Ca, Pd)_a Fe_b Bi_c M1_d M2_e R_f$ c/b is less than 0.1, and preferably less than 0.05.

The particle of the present invention has the following physical characteristics. The average particle diameter (if the particle has a plate shape, it corresponds to a plate diameter, and if the particle has a spherical shape, it corresponds to a diameter) is 10 to 30 nm, and preferably 10 to 25 nm. When the average particle diameter is larger than 30 nm, noise is high during formation of a recording medium. Therefore, the particle is not suitable for use in high-density magnetic recording. A small particle having an average particle diameter smaller than 10 nm has poor thermal stability, and therefore it is not preferable.

Further, the specific surface area of the particle calculated by the one point method for BET method is 50 to 120 $m^2/g$, and preferably 75 to 100 $m^2/g$. When the specific surface area of the particle is less than the lower limit, the particles aggregate or coagulate and are less likely to be dispersed. Thus, the surface of the coated medium may become uneven, so that medium characteristics deteriorate, and therefore this is not preferable. On the contrary, when the specific surface area is too large, the presence of superparamagnetism particles having no magnetism is suspected. The medium characteristics are generally deteriorated, and therefore the particle is not preferable.

Further, the TAP density of the particles may be 0.8 to 1.4 g/cc. When the TAP density is within this range, the packing density of the particles during the formation of a recording medium can be increased and the amount of fine powder is decreased. Therefore, a magnetic recording medium having improved magnetic characteristics can be formed and surface smoothness is improved.

The confirmation of the particle shape and the measurement of the particle volume are performed as follows. When the particle shape does not change even if the stage of TEM is inclined, that is, when the particle shape observed on a stage without inclination is round or similar to round and the particle shape observed on an inclined stage remains sphere, the particle is determined to have a sphere shape. On the other hand, when the particle shape on the inclined stage is different from that on the horizontal stage, for example, when the particle shape on the inclined stage becomes oblong in which the diameter remains the same and only the thickness varies, the particle is determined to have a plate-like shape.

On the basis of the determination, the average particle volume is calculated. When the particle shape is sphere, the particle volume is calculated by using $(4/3) \times \pi \times (\text{particle diameter}/2)^3$ in accordance with a calculation method of spherical volume. When the particle shape is plate-like, the particle volume is calculated by multiplying an area of plate face of the particle by a thickness (herein the thickness is a minimum value of thickness of the particle observed on the inclined stage). The particle volume calculated in accordance with such a calculation method is 100 to 2500 $nm^3$, and preferably 500 to 2500 $nm^3$. When a particle has a particle volume less than this range, the thermal stability thereof deteriorates, and such a particle is less unlikely to be used for application of magnetic recording. On the other hand, when the particle volume is too large, the particle diameter increases to cause particle noise, and therefore it is not preferable.

The powder pH of particle calculated in accordance with a boiling method is 4 to 9, and preferably 5 to 9. When the powder pH is adjusted to this range, effects against components eluted from the particle and other components constituting a medium can be suppressed. As a result, storage stability of a magnetic recording medium can be improved. When the powder pH is 4 or less meaning acidic, the components eluted from a magnetic particle increases by an action with a binder or the like. In addition, this may cause corrosion of the other components. When the powder pH shows strong basic, components sensitive to alkaline are affected, and therefore it is not preferable.

<Synthesis of Particle>

The magnetic powder having the properties shown above can be produced by the following process. Specifically, a so-called glass crystallization method is suitably used.

First, a glass matrix, iron and alkaline earth metal as main raw materials, and Co, Ti, Zn, Nd, and Bi as additives, and the like are mixed. The addition ratio of these components is the ratio conformed to the target amounts of the components with respect to iron as described above, provided that only the amount of the rare earth element is equal to or less than an equimolar amount to the addition amount of iron because of the following reason and is excessively larger than an amount anticipated to be contained finally.

Specifically, the amount of the rare earth element is equal to or less than an equimolar amount to the addition amount of iron, preferably 15% by mole or less, and more preferably in a range of 1.5 to 2.5% by mole. The added rare earth element in such an amount acts as a sintering inhibitor between particles during a heat treatment after formation of a glass body. When a hexagonal crystal ferrite is thus formed, the ferrite particles are each independent. Therefore, a particle having a small volume like the present invention can be formed. The form of the raw materials is preferably a salt. Specifically, the salt can be selected from nitrates, sulfates, acetates, and oxides, and oxides are suitable.

A mixing method is not limited as long as the raw materials and the glass matrix are mixed uniformly. A dry-type method is preferably employed.

The mixture is melted in an electric furnace. The melting temperature is 1000 to 1600° C., preferably 1100 to 1500° C., and more preferably 1150 to 1450° C. At this time, melting may be performed under mixing. Since glass, ferrite, and additive components have to be uniformly melted, the melting time is 6 hours or shorter, preferably 4 hours or shorter, and more preferably 2 hours or shorter.

The resultant molten metal (molten material) is quenched to form a glass body. A quenching method is not particularly limited, and a twin-roll method, a water atomizing method, and a gas atomizing method can be utilized since a quenching rate is fast. In addition, a boron compound, a silicon compound, and if needed, an alkaline metal oxide such as sodium oxide and potassium oxide may be added in an amount which does not affect the magnetic characteristics and melted. The addition amount is 10% by mass or less, preferably 5% by mass or less, and more preferably less than 2% by mass relative to the entire amount.

The obtained glass body may be pulverized. The known method can be utilized for pulverizing, and for example, a ball mill may be used for cracking. The method can appropriately vary depending on a scale. In order to obtain a magnetic powder having uniform magnetic characteristics, it is preferable that remaining coarse particles be removed with a sieve during the pulverizing.

The resultant pulverized glass product is subjected to a heat treatment to deposit ferrite. The temperature during the heat treatment has to be a temperature capable of forming ferrite, and is 450° C. or higher and 900° C. or lower, preferably 500° C. or higher and 850° C. or lower, and more preferably 550° C. or higher and 700° C. or lower. The heat treatment may be a one-step heating process which is performed at a single temperature, or a multi-step heating process which is performed at different treatment temperatures in a plurality of steps. The heat treatment time is 30 minutes or longer, and preferably 1 hour or longer.

A glass component is removed from the obtained glass body containing ferrite. At this time, it is suitable that acetic acid diluted to a degree of 10% by mass be used and the treatment temperature be 50° C. or higher. In order to remove the glass body, the acetic acid is suitably boiled in some cases, or stirred for uniform removal. By such washing, rare earth elements remaining in the glass body after the formation of ferrite can be removed.

Acetic acid and the like which are adhered to the surface of the obtained ferrite magnetic powder are removed by washing. Pure water may be used for washing. Alternatively, pure water may be boiled to remove the adhered components. In some cases, it is preferable that washing be performed while the acetic acid adhered during the washing is neutralized with aqueous ammonium or an aqueous solution of sodium hydroxide. After then, washing is sufficiently performed using pure water as a washing liquid until the pH of a filtrate is about 6 to 8. Most of the particles have a form of aggregate, and acetic acid and reaction residues sometimes exist in spaces between the particles. Therefore, it is preferable that the particles be exposed to an ultrasonic wave through the removing and washing steps to remove the glass body and wash the particles. Thus, the remaining amount of the rare earth element can be suppressed to less than 15% relative to the total addition amount and as a result, nonmagnetic components can be removed. This contributes to improvement of the magnetic characteristics of the particles.

Ferrite obtained after the washing can be subjected to a moisture removal process at 100° C. or higher in air to obtain a dried powder. Moisture in an amount of about 0.5 to 5.0% by mass may be adhered to the surface of the dried magnetic powder under wet environment at about 80% RH.

<Evaluation of Magnetic Powder>

The physical properties of the obtained magnetic powder were evaluated by the following method.

<Composition of Particles>

The obtained magnetic powder was evaluated using the finally obtained magnetic powder by the following method. A sample is dissolved in iron and titrated using an automatic Titrator (COMTITE-980) manufactured by HIRANUMA SANGYO Co., Ltd. The amounts of the alkaline earth metal and the additives were quantitatively determined by dissolving the powder and using an inductively coupled plasma spectrometry ICP (IRIS/AP) manufactured by NIPPON JARRELL ASH Co., Ltd.

<Form of Particle>

An image obtained by observing the magnetic powder in a bright field using a transmission electron microscope (JEM-100CXMark-II manufactured by JEOL Ltd.) under an accelerated voltage of 100 kV was photographed and about 100 particles to be measured on the basis of the following basis were measured. From the resultants, the average plate thickness and average plate diameter of the particle were calculated.

Among the particles on the transmission electron microscope photograph, the basis of selection of particles to be measured was as follows.

(1) A particle of which a part is located outside a visual field of the photograph is not measured.

(2) A particle of which the outline is clear and which is isolated is measured.

(3) A particle which does not have a plate-like shape but can be measured as a single particle is measured.

(4) Particles which overlap each other and have a clear border and of which the whole shape is distinguishable are each measured as a single particle.

(5) Particles which overlap each other and have an unclear border and a whole indistinguishable shape are determined to be indistinct and are not measured.

The presence or absence of bond between the particles, that is, simple overlap of the particles or sintering was determined as follows.

(a) A plurality of photographs having different focuses were prepared. From a photograph showing a fringe (which is a borderline observed at a portion where a substance varies in a bright field of an electron microscope) very well, a border region of the particles was determined.

(b) In overlapping particles, a portion where the outlines of both the particles cross was observed. When both the outlines were rounded and cross, the particles were determined to cause sintering. When both the outlines and other outlines in the whole crossing portion meet at a point with an independent angle, it was determined that the particles only overlap.

(c) When the presence or absence of the border was unclear and determination was difficult, sintering between the particles was not determined, and the particles were each measured and estimated simply.

<Calculation of Particles>

The average particle volume was calculated using cylindrical approximation. Specifically, it was calculated by an equation: (average particle volume)=average plate thickness$\times \pi \times$(average plate diameter/2)$^2$.

<Specific Surface Area of Particle>

The specific surface area of a particle was measured by the one point method for BET method using 4 SORB US manufactured by Yuasa Ionics Co., Ltd., as a measurement apparatus.

<Calculation of Powder pH of Particle>

Powder measurement of particles is performed by a method described in JIS K 5101-17-1: 2004 (Test methods for pigments-Part 17: pH value—Section 1: Hot extraction method). An outline is as follows.

A 10% suspension of powders to be tested is prepared using pure water in which carbon dioxide is degassed in a glass container. The suspension is boiled by heating for about 5 minutes with the container uncovered. After the boiling, it continues to be boiled for additional 5 minutes. The container is covered with a lid and the suspension is cooled to normal temperature, water is added in an amount of decrease by the boiling, and the container is shaken for 1 minute. Five minutes after standing, the pH of the suspension is measured to obtain the powder pH.

<Evaluation of Powder Magnetic Characteristics>

A plastic container of $\phi$6 mm was filled with a magnetic powder, and the coercive force Hc (Oe, kA/m), saturation magnetization $\sigma$s (Am$^2$/kg), squareness ratio SQ, BSFD of a powder body (SFD value in a bulk state) were measured in an external magnetic field of 10 kOe (795.8 kA/m) using a VSM apparatus (VSM-7P) manufactured by Toei Industry Co., Ltd.

<Coercive Force Value Per Unit Volume>

The coercive force value of the magnetic powder calculated in the evaluation of the powder magnetic characteristics was divided by the calculated average particle volume to obtain a coercive force value per unit volume (nm$^3$). The magnetic powder of the present invention has a coercive force value per unit volume (Oe/nm$^3$) of 0.90 or more as calculated.

<Evaluation of Single Layer Magnetic Tape>

0.35 g of the obtained magnetic powder (magnetic powder as a final product) was weighed and put into a pot (inner diameter: 45 mm, depth: 13 mm), and the magnetic powder was left for 10 minutes while the pot was uncovered. 0.7 mL of vehicle (mixed solution of a vinyl chloride-based resin MR-555 (20% by mass) available from ZEON CORPORATION, VYLON (registered trademark) UR-8200 (30% by mass) available from TOYOBO CO., LTD., cyclohexanone (50% by mass), acetyl acetone (0.3% by mass), and n-butyl stearate (0.3% by mass)) was added using a micropipette. Immediately after the addition, 30 g of steel balls (2φ) and 10 nylon balls (8φ) were added to the pot. The pot was covered with a lid and this was allowed to stand for 10 minutes.

Next, the pot was set in a centrifugal ball mill (FRITSH P-6). The revolution speed was gradually increased and adjusted to 600 rpm, and dispersion was performed for 60 minutes. After the centrifugal ball mill was stopped, the pot was taken out, and 1.8 mL of a preparation liquid previously prepared by mixing methyl ethyl ketone and toluene in a ratio of 1:1 was added using a micropipette. The pot was set in the centrifugal ball mill again, and the mixture was dispersed at 600 rpm for 5 minutes to prepare a magnetic coating.

The lid of the pot was opened, the nylon balls were removed, and the magnetic coating was put into an applicator (550 μm) together with the steel balls. The magnetic coating was applied to a base film (polyethylene film 15C-B500 available from TORAY INDUSTRIES, INC, film thickness: 15 μm). Immediately after the applying, the film was put at the center of the coil of an aligning apparatus of 5.5 kG, oriented in a magnetic field, and dried to prepare a magnetic tape. The thickness of coating film after the drying is 3 μm. In order to confirm the effect of metallic magnetic powder more distinctly, a magnetic single layer tape without a non-magnetic layer was prepared. Further, a calendar treatment was not performed.

The thus prepared magnetic tape as a medium was subjected to magnetic measurement using the VSN apparatus (VSM-7P) manufactured by Toei Industry Co., Ltd., and the coercive force Hcx (Oe, kA/m), coercive force distribution SFDx in a parallel direction to the surface of the magnetic layer, maximum energy product BHmax, squareness ratio SQx in a parallel direction to the surface of the magnetic layer, squareness ratio SQz in a vertical direction to the surface of the magnetic layer, and orientation ratio OR were obtained.

EXAMPLES

Example 1

162.04 g of iron oxide (available from Tetsugen Corporation, HRT) and 289.69 g of barium carbonate (available from Sakai Chemical Industry Co., Ltd., BW-P) as main components were weighed. 89.47 g of boron oxide (available from Borax, for industrial product use) as a glass formation component, 6.08 g of cobalt oxide (available from Wako Pure Chemical Industries, Ltd., grade reagent), 6.48 g of titanium dioxide (available from Wako Pure Chemical Industries, Ltd., grade reagent), 18.91 g of bismuth oxide (available from KANTO CHEMICAL CO., INC., reagent), and 27.32 g of neodymium oxide (available from KISHIDA CHEMICAL Co., Ltd., 3N) as additives were weighed. The amounts of these components were used so that the molar ratio of rare earth element to iron was 8%. In the following Examples, the components were prepared so that the molar ratio of rare earth element to iron was 8%.

The obtained mixture was ground in an automatic mortar for 10 minutes until it was uniform. The mixture thus obtained was put in a platinum crucible, dissolved at 1400° C., and maintained to this temperature for 60 minutes. As a result, the mixture was completely dissolved.

The resultant molten metal (molten material) was quenched by the twin roll method to form a glass body. After then, the glass body was cracked. The obtained glass body was sieved through a mesh having an opening of 53 μm to remove coarse particles, and a heat treatment was performed at 650° C. over 1 hour.

After the heat treatment, a powder was immersed in 10% by mass acetic acid heated at 60° C., and this was maintained for 60 minutes to remove the glass body. Acetic acid adhered to the surface of the powder was then removed using pure water to obtain a ferrite powder. This powder was dried at 110° C. in air for 4 hours to obtain a magnetic powder.

Examples 2 to 5

The procedure in Example 1 was repeated except that samarium oxide (available from RARE METALLIC Co., Ltd., 3N), yttrium oxide (available from KISHIDA CHEMICAL Co., Ltd., 3N), erbium oxide (available from RARE METALLIC Co., Ltd., 3N), and holmium oxide (available from RARE METALLIC Co., Ltd., 3N) were used in Examples 2 to 5, respectively, instead of 27.32 g of neodymium oxide (available from KISHIDA CHEMICAL Co., Ltd., 3N) in Example 1, the addition amounts shown in Table 1 were used, the heat treatment temperature was 1400° C., and the melting time was 4 hours. Physical and magnetic characteristics of the resulting particles are shown in Tables 2 to 4.

Examples 6 to 8

The magnetic powders were obtained in the same manner as in Example 1 except that the conditions shown in Table 1 were used as a heat treatment temperature condition. Characteristics of the resulting particles are shown in Table 2.

Examples 9 to 10

The procedure of Example 1 was repeated except that the addition amount of neodymium and the heat treatment temperature in Examples 6 to 8 were changed. Physical and magnetic characteristics of the resulting particles are shown in Tables 2 to 4.

Comparative Example 1

The magnetic powder was obtained in the same manner as in Example 1 except that neodymium oxide was not added, the glass melting temperature was 1300° C., and the melting time was 240 minutes. Physical and magnetic characteristics of the resulting particles are shown in Tables 2 to 4.

Comparative Examples 2 to 4

The magnetic powders were obtained in the same manner as in Example 1 except that the conditions shown in Table 1 were used as a heat treatment temperature condition. Physical and magnetic characteristics of the resulting particles are shown in Tables 2 to 4.

TABLE 1

|  | ADDED RARE EARTHS | | | GLASS MELTING | | HEAT TREATMENT |
| --- | --- | --- | --- | --- | --- | --- |
|  | KIND | R/Fe (at %) | ADDITION AMOUNT (g) | TEMPERATURE (° C.) | TIME (min) | TEMPERATURE (° C.) |
| EXAMPLE 1 | Nd | 8.0 | 27.32 | 1400 | 60 | 650 |
| EXAMPLE 2 | Sm | 8.0 | 28.80 | 1400 | 240 | 650 |
| EXAMPLE 3 | Y | 8.0 | 18.48 | 1400 | 240 | 650 |
| EXAMPLE 4 | Er | 8.0 | 31.44 | 1400 | 240 | 650 |
| EXAMPLE 5 | Ho | 8.0 | 31.20 | 1400 | 240 | 650 |
| EXAMPLE 6 | Nd | 8.0 | 27.32 | 1400 | 60 | 640 |
| EXAMPLE 7 | Nd | 8.0 | 27.32 | 1400 | 60 | 655 |
| EXAMPLE 8 | Nd | 8.0 | 27.32 | 1400 | 60 | 650 |
| EXAMPLE 9 | Nd | 10.0 | 34.15 | 1300 | 60 | 665 |
| EXAMPLE 10 | Nd | 12.0 | 40.98 | 1300 | 60 | 665 |
| COMPARATIVE EXAMPLE 1 | — | — | — | 1300 | 240 | 640 |
| COMPARATIVE EXAMPLE 2 | — | — | — | 1300 | 240 | 665 |
| COMPARATIVE EXAMPLE 3 | — | — | — | 1300 | 240 | 690 |
| COMPARATIVE EXAMPLE 4 | — | — | — | 1500 | 240 | 665 |

TABLE 2

|  | COMPOSITION | | | | SPECIFIC SURFACE AREA BET ($m^2/g$) | PLATE DIAMETER (nm) | PARTICLE VOLUME ($nm^3$) |
| --- | --- | --- | --- | --- | --- | --- | --- |
|  | Bi/Fe (at %) | RARE EARTH ELEMENTS | R/Fe (at %) | RARE EARTH ELEMENTS (%) |  |  |  |
| EXAMPLE 1 | 3.2 | Nd | 0.8 | 10.0 | 84.2 | 21 | 1670 |
| EXAMPLE 2 | 2.7 | Sm | 0.7 | 8.8 | 84.7 | 21 | 1720 |
| EXAMPLE 3 | 2.9 | Y | 0.7 | 8.8 | 85.1 | 21 | 1650 |
| EXAMPLE 4 | 2.8 | Er | 1.0 | 12.5 | 77.7 | 22 | 2200 |
| EXAMPLE 5 | 2.8 | Ho | 0.9 | 11.3 | 83.5 | 21 | 1770 |
| EXAMPLE 6 | 3.2 | Nd | 0.8 | 10.0 | 86.1 | 19 | 1550 |
| EXAMPLE 7 | 3.2 | Nd | 0.8 | 10.0 | 76.0 | 23 | 2400 |
| EXAMPLE 8 | 3.2 | Nd | 0.8 | 10.0 | 86.0 | 20 | 1610 |
| EXAMPLE 9 | 2.8 | Nd | 0.5 | 5.0 | 87.7 | 23 | 2190 |
| EXAMPLE 10 | 2.8 | Nd | 0.6 | 4.8 | 89.8 | 22 | 1980 |
| COMPARATIVE EXAMPLE 1 | 2.7 | — | — | — | 60.8 | 21 | 2680 |
| COMPARATIVE EXAMPLE 2 | 2.7 | — | — | — | 46.9 | 25 | 3950 |
| COMPARATIVE EXAMPLE 3 | 2.7 | — | — | — | 41.0 | 29 | 7700 |
| COMPARATIVE EXAMPLE 4 | 2.7 | — | — | — | 66.5 | 20 | 2100 |

TABLE 3

| | POWDER MAGNETIC CHARACTERISTICS | | | | | |
| --- | --- | --- | --- | --- | --- | --- |
| | Hc | | σs | SQ | BSFD | Hc/vol |
| | (Oe) | kA/m | ($Am^2/kg$) | | | $Oe/nm^3$ |
| EXAMPLE 1 | 2141 | 170.4 | 45.0 | 0.492 | 0.886 | 1.28 |
| EXAMPLE 2 | 2236 | 177.9 | 44.0 | 0.505 | 0.692 | 1.30 |
| EXAMPLE 3 | 2212 | 176.0 | 42.3 | 0.494 | 0.703 | 1.34 |
| EXAMPLE 4 | 2306 | 183.5 | 44.6 | 0.495 | 0.816 | 1.05 |
| EXAMPLE 5 | 2264 | 180.2 | 44.2 | 0.503 | 0.712 | 1.28 |
| EXAMPLE 6 | 1956 | 155.7 | 42.8 | 0.480 | 0.998 | 1.26 |
| EXAMPLE 7 | 2528 | 201.2 | 45.5 | 0.516 | 0.584 | 1.05 |
| EXAMPLE 8 | 2091 | 166.4 | 43.5 | 0.493 | 0.844 | 1.30 |
| EXAMPLE 9 | 2283 | 181.7 | 46.1 | 0.511 | 0.627 | 1.04 |
| EXAMPLE 10 | 2306 | 183.5 | 45.9 | 0.514 | 0.604 | 1.16 |
| COMPARATIVE EXAMPLE 1 | 2049 | 163.1 | 44.3 | 0.445 | 1.811 | 0.76 |
| COMPARATIVE EXAMPLE 2 | 3053 | 243.0 | 47.5 | 0.520 | 0.761 | 0.77 |
| COMPARATIVE EXAMPLE 3 | 3622 | 288.2 | 49.6 | 0.544 | 0.442 | 0.47 |
| COMPARATIVE EXAMPLE 4 | 1446 | 115.1 | 41.6 | 0.409 | 2.504 | 0.69 |

TABLE 4

| | SINGLE LAYER MAGNETIC CHARACTERISTICS | | | | | |
| --- | --- | --- | --- | --- | --- | --- |
| | Hc | | SFD | SQx | OR | SQz |
| | (Oe) | kA/m | | | | |
| EXAMPLE 1 | 2472 | 196.7 | 0.592 | 0.686 | 1.68 | 0.425 |
| EXAMPLE 2 | 2569 | 204.4 | 0.465 | 0.710 | 1.70 | 0.443 |
| EXAMPLE 3 | 2505 | 199.3 | 0.472 | 0.693 | 1.70 | 0.404 |

TABLE 4-continued

| | SINGLE LAYER MAGNETIC CHARACTERISTICS | | | | | |
|---|---|---|---|---|---|---|
| | Hc | | | | | |
| | (Oe) | kA/m | SFD | SQx | OR | SQz |
| EXAMPLE 4 | 2632 | 209.4 | 0.542 | 0.666 | 1.63 | 0.397 |
| EXAMPLE 5 | 2553 | 203.2 | 0.475 | 0.691 | 1.70 | 0.400 |
| EXAMPLE 6 | 2236 | 177.9 | 0.522 | 0.654 | 1.64 | 0.451 |
| EXAMPLE 7 | 2823 | 224.6 | 0.498 | 0.689 | 1.71 | 0.387 |
| EXAMPLE 8 | 2386 | 189.9 | 0.561 | 0.675 | 1.67 | 0.423 |
| EXAMPLE 9 | 2606 | 207.4 | 0.406 | 0.715 | 1.82 | 0.467 |
| EXAMPLE 10 | 2607 | 207.5 | 0.394 | 0.718 | 1.78 | 0.452 |
| COMPARATIVE EXAMPLE 1 | 2723 | 216.7 | 0.664 | 0.653 | 1.45 | 0.442 |
| COMPARATIVE EXAMPLE 2 | 3099 | 246.6 | 0.641 | 0.641 | 1.41 | 0.446 |
| COMPARATIVE EXAMPLE 3 | 3378 | 268.8 | 0.783 | 0.553 | 1.23 | 0.510 |
| COMPARATIVE EXAMPLE 4 | 1354 | 107.7 | 0.721 | 0.633 | 1.38 | 0.493 |

As shown in Table 2, the ratio of the rare earth element remaining in the magnetic powder to the total charged amount is about 4.8 to 12.5%. Therefore, it is found that the rare earth element in an amount of about 90% of the total charged amount exists in the glass body and outflows during the washing.

Addition of the rare earth element in a very small amount has an effect of enhancing crystallinity and increasing a coercive force, but little effect of increasing magnetization magnitude. Therefore, it is not preferable from the viewpoint of balance of magnetic characteristics that a method by which a large amount of rare earth element is contained in the magnetic powder be utilized. However, according to the method of the present invention, an excess amount of the rare earth element does not remain, and only addition effect can be achieved.

When comparing between Examples according to the present invention and Comparative Examples using no rare earth element, BET values in Comparative Examples are smaller than those in Examples as shown in Table 2. This proves that the presence of the rare earth element during deposition of ferrite in the glass body increases the BET value.

Figure 2:
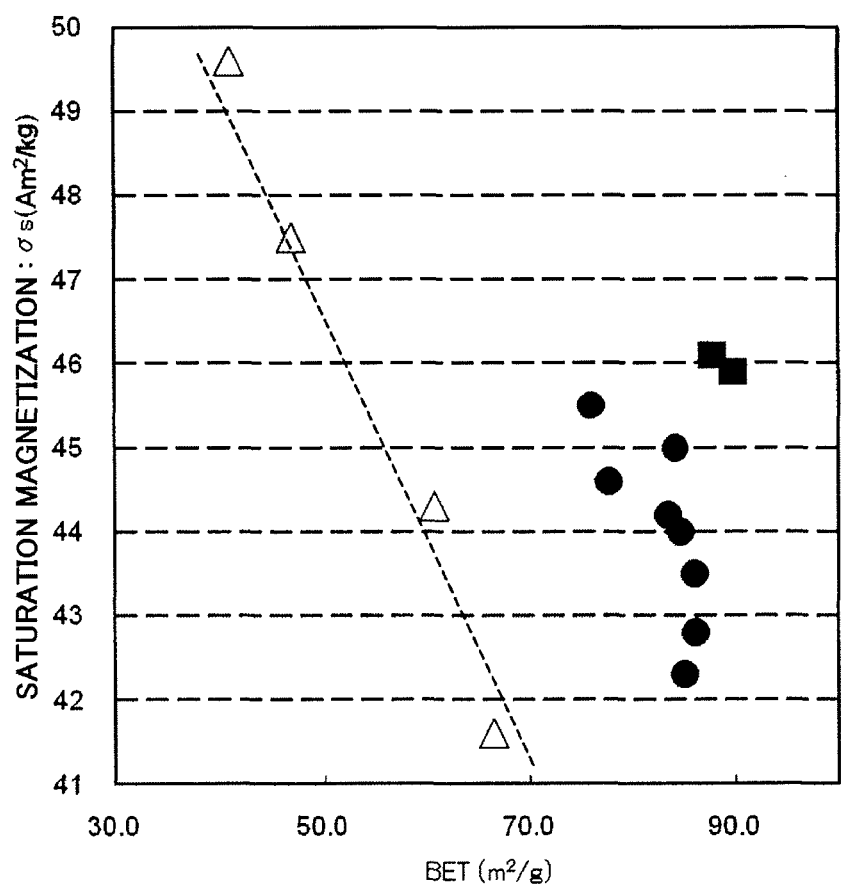
FIG. 2 is a diagram showing the correlation between a specific surface area and saturation magnetization according to the present invention and Comparative Examples.
Figure 3:
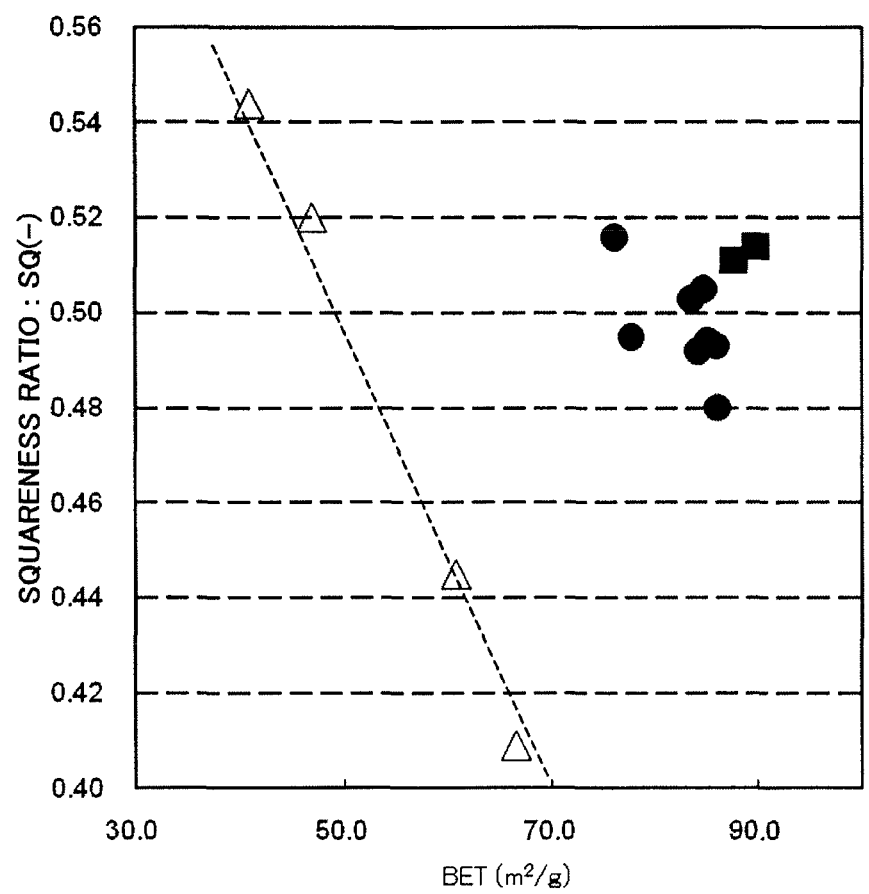
FIG. 3 is a diagram showing the correlation between a specific surface area and a squareness ratio SQ according to the present invention and Comparative Examples.
Figure 4:
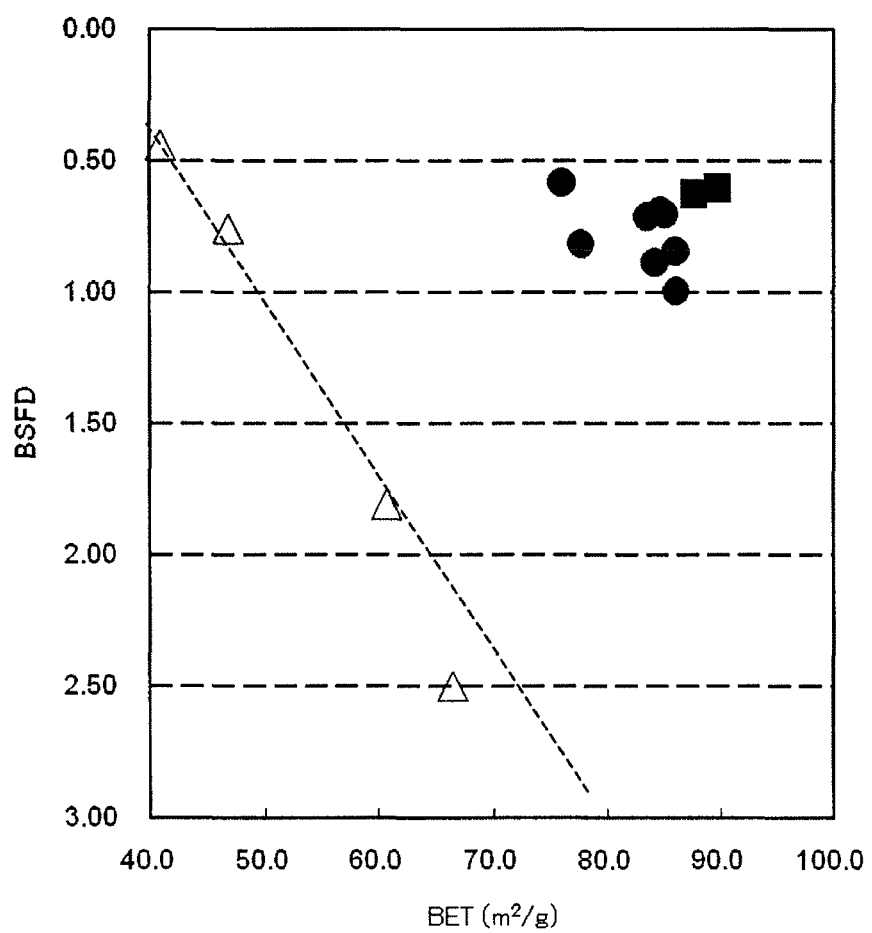
FIG. 4 is a diagram showing the correlation between a specific surface area and SFD according to Examples and Comparative Examples.

FIGS. 1 to 4 show correlation diagrams of a specific surface area and each magnetic characteristic in a magnetic powder state. These diagrams show a relation of BET in Table 2 and magnetic characteristics in Table 3. In all graphs, the horizontal axis shows BET ($m^2/g$), and the vertical axis shows each magnetic characteristic of a coercive force, saturation magnetization, a squareness ratio, and SFD. Examples of the present invention in which the rare earth element is mixed in a glass body and particles are microparticulated are represented by black circles and black squares (Examples 9 and 10) in the drawings. Comparative Examples in which the rare earth element is not used are represented by open triangles in the drawings.

In Comparative Examples, the BET and magnetic characteristics are highly correlative with each other. All of the magnetic characteristics tend to be decreased or deteriorated when the BET is increased. In all graphs, a dotted line is a straight line showing the correlation of the BET and each of the magnetic characteristics. It is found that the samples in Examples of the present invention which are represented by black circles and black squares in the graphs show high magnetic characteristics in a case of the same BET and high BET in a case of the same magnetic characteristics as compared with Comparative Examples with respect to each magnetic characteristic.

Accordingly, it is found that a magnetic powder of Example using a rare earth element simultaneously satisfied three characteristics of a high coercive force, high saturation magnetization, and high BET (small particle).

As seen from items (Hc/vol) in Table 3, with respect to magnetic characteristics of a powder, a coercive force value per unit volume of the powder is higher than that of the conventional hexagonal crystal ferrite. This shows that a component involving magnetism expression in the particles is increased as compared with the conventional particles. Therefore, the powder is considered to maintain high magnetic characteristics despite a smaller actual particle volume as compared with the conventional magnetic particles.

The orientation ratio (OR) of a magnetically oriented single layer film in Examples is higher than that in Comparative Examples as seen from the results in Table 4. Therefore, it is speculated that each particle of the magnetic powder in each Example is isolated and has higher magnetic uniaxiality as compared with that in Comparative Examples. In addition, the particle in Examples has a smaller SFD value as compared with that in Comparative Examples. Accordingly, when a tape-shaped recording medium is formed, it is expected to have high output.

INDUSTRIAL APPLICABILITY

The hexagonal crystal ferrite according to the present invention is a magnetic powder which is composed of ultrafine particles and has high magnetic characteristics. Therefore, it can be widely used for an application requiring a high coercive force and storage stability such as a high-density magnetic recording medium, a wave absorber, and a drug transporting application in a drug delivery system.

The invention claimed is:

1. A method for producing a hexagonal crystal ferrite formed using a glass crystallization method, the method comprising the steps of:
   mixing a glass matrix with raw materials including iron, bismuth, a divalent metal (M1), a tetravalent metal (M2), any one kind (A) of barium, strontium, calcium, and lead, and at least one kind of rare earth element (represented by R) having a mole equal to or less than that of the iron;
   heating the mixed raw materials to obtain a molten material;
   quenching the molten material to form a glass body, then pulverizing the glass body, and performing a heat treatment; and
   washing the glass body after the heat treatment with an acid solution.

2. A hexagonal crystal ferrite powder formed from iron, bismuth, a divalent metal (represented by M1), a tetravalent metal (represented by M2), any one kind (A) of barium, strontium, calcium, and lead, and at least one kind of rare earth element (represented by R);
   wherein the hexagonal crystal ferrite powder has a specific surface area, calculated by a one point method for BET method, of 50 to 120 $m^2/g$.

3. The hexagonal crystal ferrite powder according to claim 2, wherein an amount of rare earths is 0.2 to 1.0% by atomic weight relative to iron.

4. The hexagonal crystal ferrite powder according to claim 2, wherein the rare earth is Nd (neodymium), Sm (samarium), and Y (yttrium).

5. The hexagonal crystal ferrite powder according to claim 2, having an average particle volume of 100 to 2500 nm$^3$.

6. The hexagonal crystal ferrite powder according to claim 2, wherein the powder is a magnetic powder, and has properties including a coercive force of 119.4 to 238.9 kA/m (1500 to 3000 Oe) and a saturation magnetization of 30 to 60 Am$^2$/kg (30 to 60 emu/g).

7. A coating composition in which the hexagonal crystal ferrite powder according to claim 2 is dispersed.

8. A magnetic recording medium comprising the hexagonal crystal ferrite powder according to claim 2.

9. The hexagonal crystal ferrite powder according to claim 2, wherein the powder has an average particle volume of 100 to 2500 nm$^3$ and is a magnetic powder, and has properties including a coercive force of 119.4 to 238.9 kA/m (1500 to 3000 Oe) and a saturation magnetization of 30 to 60 Am$^2$/kg (30 to 60 emu/g).

10. A hexagonal crystal ferrite powder formed from iron, bismuth, a divalent metal (represented by M1), a tetravalent metal (represented by M2), any one kind (A) of barium, strontium, calcium, and lead, and at least one kind of rare earth element (represented by R), wherein the powder has an average particle volume of 100 to 2500 nm$^3$.

11. The hexagonal crystal ferrite powder according to claim 10, wherein the powder is a magnetic powder, and has properties including a coercive force of 119.4 to 238.9 kA/m (1500 to 3000 Oe) and a saturation magnetization of 30 to 60 Am$^2$/kg (30 to 60 emu/g).

12. A coating composition in which the hexagonal crystal ferrite powder according to claim 10 is dispersed.

13. A magnetic recording medium comprising the hexagonal crystal ferrite powder according to claim 10.

14. A hexagonal crystal ferrite powder formed from iron, bismuth, a divalent metal (represented by M1), a tetravalent metal (represented by M2), any one kind (A) of barium, strontium, calcium, and lead, and at least one kind of rare earth element (represented by R); wherein the powder is a magnetic powder, and has properties including a coercive force of 119.4 to 238.9 kA/m (1500 to 3000 Oe) and a saturation magnetization of 30 to 60 Am$^2$/kg (30 to 60 emu/g).

15. A coating composition in which the hexagonal crystal ferrite powder according to claim 14 is dispersed.

16. A magnetic recording medium comprising the hexagonal crystal ferrite powder according to claim 14.

* * * * *